United States Patent
Feng et al.

(10) Patent No.: US 9,986,501 B2
(45) Date of Patent: May 29, 2018

(54) DYNAMIC CELL CLUSTER INTERFERENCE MANAGEMENT SCHEME USING DYNAMIC POINT SELECTION (DPS) OR SEMI-STATIC POINT SELECTION (SPSS) FOR ENHANCED INTERFERENCE MANAGEMENT AND TRAFFIC ADAPTATION (EIMTA)

(71) Applicants: QUALCOMM INCORPORATED, San Diego, CA (US); Minghai Feng, San Diego, CA (US); Neng Wang, San Diego, CA (US); Chao Wei, San Diego, CA (US); Jilei Hou, San Diego, CA (US)

(72) Inventors: Minghai Feng, Beijing (CN); Neng Wang, Beijing (CN); Chao Wei, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 14/782,300

(22) PCT Filed: Apr. 9, 2013

(86) PCT No.: PCT/CN2013/073976
§ 371 (c)(1),
(2) Date: Oct. 2, 2015

(87) PCT Pub. No.: WO2014/166067
PCT Pub. Date: Oct. 16, 2014

(65) Prior Publication Data
US 2016/0044594 A1 Feb. 11, 2016

(51) Int. Cl.
H04W 48/20 (2009.01)
H04W 72/12 (2009.01)
(Continued)

(52) U.S. Cl.
CPC .......... H04W 48/20 (2013.01); H04B 7/024 (2013.01); H04B 7/06 (2013.01); H04B 7/0608 (2013.01);
(Continued)

(58) Field of Classification Search
None
See application file for complete search history.

(56) References Cited

U.S. PATENT DOCUMENTS 9,185,669 B2 * 11/2015 Lee .................. H04W 56/001
2012/0021738 A1 1/2012 Koo et al.
(Continued)

FOREIGN PATENT DOCUMENTS

CN 101834701 A 9/2010
CN 102960040 A 3/2013
(Continued)

OTHER PUBLICATIONS

Supplementary European Search Report—EP13881690—Search Authority—Munich—dated Nov. 28, 2016.
(Continued)

*Primary Examiner* — Min Jung
(74) *Attorney, Agent, or Firm* — Harrity & Harrity, LLP/Qualcomm

(57) ABSTRACT

Methods and apparatus are disclosed for interference management. The interference management is based on dynamic point selection or semi-static point selection. The method includes determining interference at a plurality of network nodes. The method includes selecting a transmission point from the plurality of network nodes for a transmission to at least one mobile entity based on the determined interference.

32 Claims, 16 Drawing Sheets

(51) Int. Cl.
*H04B 7/024* (2017.01)
*H04B 7/06* (2006.01)
*H04W 16/10* (2009.01)
*H04W 74/00* (2009.01)
*H04J 11/00* (2006.01)
*H04W 84/04* (2009.01)
*H04W 84/02* (2009.01)
*H04W 88/02* (2009.01)
*H04W 88/08* (2009.01)

(52) U.S. Cl.
CPC ........... *H04J 11/005* (2013.01); *H04W 16/10* (2013.01); *H04W 72/1226* (2013.01); *H04W 74/002* (2013.01); *H04W 84/02* (2013.01); *H04W 84/045* (2013.01); *H04W 88/02* (2013.01); *H04W 88/08* (2013.01)

(56) References Cited

U.S. PATENT DOCUMENTS

| | | | |
|---|---|---|---|
| 2012/0028584 A1 | 2/2012 | Zhang et al. | |
| 2012/0157096 A1* | 6/2012 | Baek | H04B 17/318 455/434 |
| 2012/0170557 A1* | 7/2012 | Tsfati | H04W 72/1215 370/338 |
| 2012/0287799 A1 | 11/2012 | Chen et al. | |
| 2012/0320775 A1 | 12/2012 | Lee et al. | |
| 2013/0114658 A1* | 5/2013 | Davydov | H04W 4/06 375/224 |
| 2013/0237234 A1* | 9/2013 | Jiao | H04W 24/02 455/444 |
| 2013/0322235 A1* | 12/2013 | Khoryaev | H04W 24/10 370/229 |
| 2015/0045076 A1* | 2/2015 | Pan | H04W 16/10 455/501 |
| 2015/0092627 A1* | 4/2015 | Liu | H04B 7/2656 370/280 |
| 2015/0351108 A1* | 12/2015 | Cui | H04W 16/14 370/329 |
| 2016/0013921 A1* | 1/2016 | Nagata | H04W 16/10 370/330 |
| 2016/0127069 A1* | 5/2016 | Nuss | H04W 16/10 370/329 |

FOREIGN PATENT DOCUMENTS

| | | |
|---|---|---|
| JP | 2011205326 A | 10/2011 |
| JP | 2013502182 A | 1/2013 |
| WO | WO-2011020062 A2 | 2/2011 |
| WO | 2011056726 A1 | 5/2011 |
| WO | 2013003617 A2 | 1/2013 |
| WO | 2013025943 | 2/2013 |

OTHER PUBLICATIONS

Nokia Corporation, Nokia Siemens Networks, "UL-DL Interference Mitigation for Dynamic TDD UL-DL reconfiguration[online]," 3GPP TSG-RAN WG1#72b R1-131222, URL:http://www.3gpp.org/ftp/tsg_ran/WG1_RL1/TSGR1_72b/Docs/R1-131222.zip, Apr. 9, 2013, 10 pages.

International Search Report and Written Opinion—PCT/CN2013/073976—ISA/EPO—dated Jan. 16, 2014.

* cited by examiner

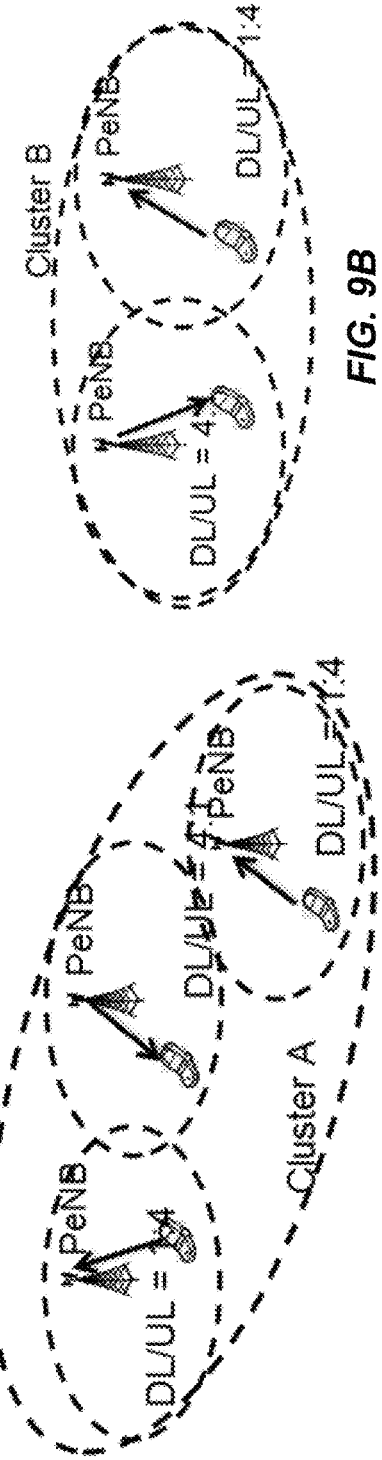
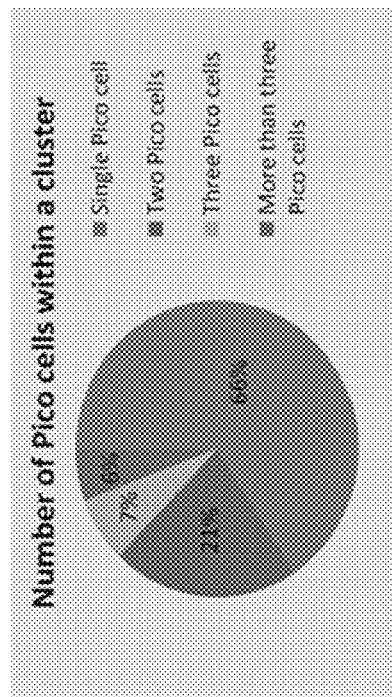
FIG. 9B
FIG. 9A
FIG. 9C

DYNAMIC CELL CLUSTER INTERFERENCE MANAGEMENT SCHEME USING DYNAMIC POINT SELECTION (DPS) OR SEMI-STATIC POINT SELECTION (SPSS) FOR ENHANCED INTERFERENCE MANAGEMENT AND TRAFFIC ADAPTATION (EIMTA)

FIELD

The present disclosure relates generally to communication systems, and more specifically to techniques for interference management.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that may support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells). In this context, there remains a need for improved interference management of wireless communication devices. There is further a need for interference management using cell clusters to make better use of the available spectrum resources.

SUMMARY

Methods and apparatus for interference mitigation are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for interference management is disclosed. The method includes determining interference at a plurality of network nodes. The method includes selecting a transmission point from the plurality of network nodes for a transmission to at least one mobile entity based on the determined interference.

In another aspect, an apparatus for interference management includes at least one processor configured to: determine interference at a plurality of network node, and select a transmission point from the plurality of network nodes for a transmission to at least one mobile entity based on the determined interference. The apparatus includes a memory coupled to the at least one processor for storing data.

In another aspect, an apparatus for interference management includes means for determining interference at a plurality of network nodes. The apparatus includes means for selecting a transmission point from the plurality of network nodes for a transmission to at least one mobile entity based on the determined interference.

In another aspect a computer program product includes a computer-readable medium including code for causing a computer to: determine interference at a plurality of network node, and select a transmission point from the plurality of network nodes for a transmission to at least one mobile entity based on the determined interference.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIGS. 9A-C illustrate de-clustering methods and related issues.

DETAILED DESCRIPTION

Figure 1:
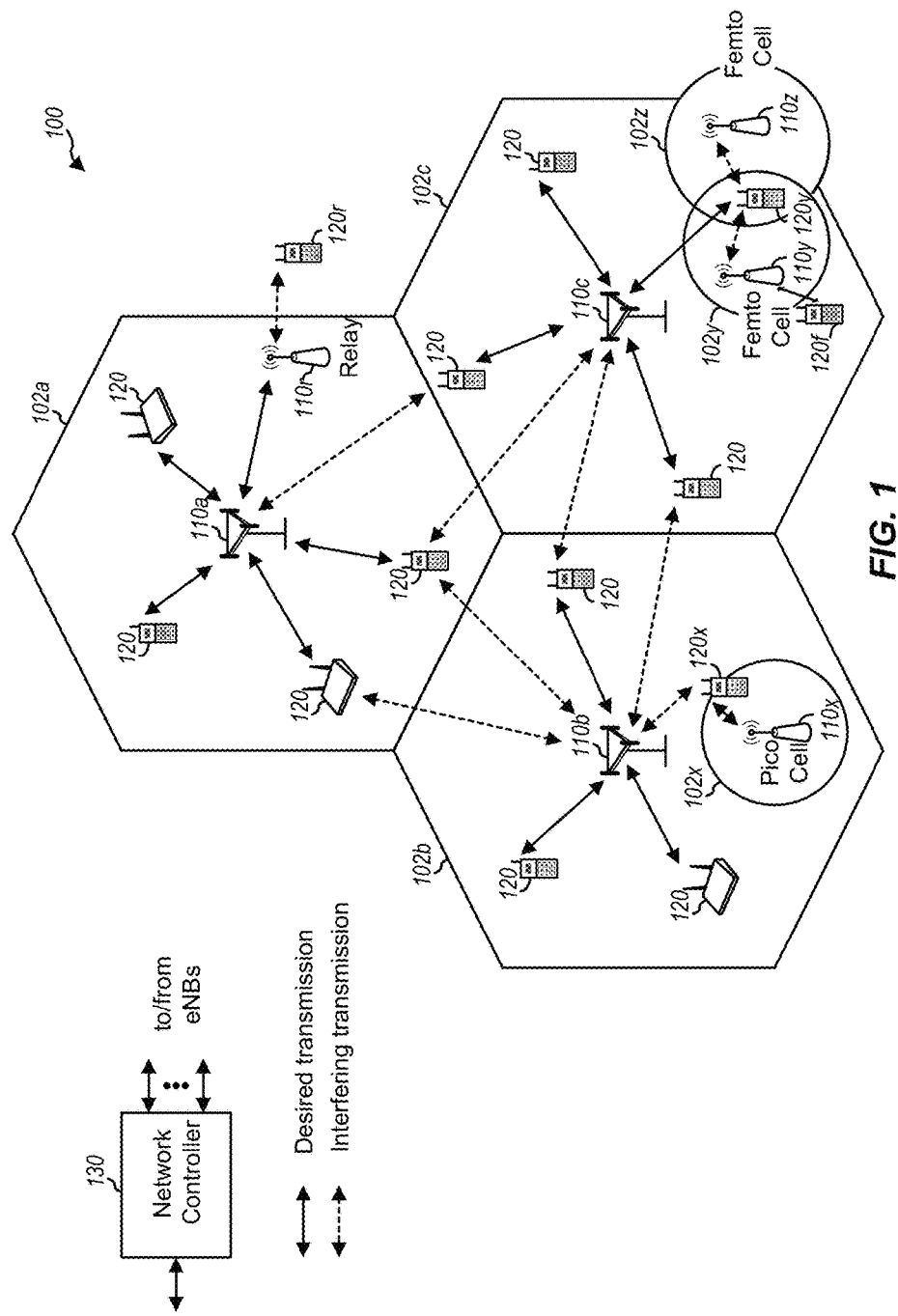
FIG. 1 is a block diagram conceptually illustrating an example of a telecommunications system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which may be a wired terminal or a wireless terminal. A terminal may also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100, which may be an LTE network, is illustrated in accordance with various embodiments presented herein. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For example, UE 120y may be in proximity to femto eNBs 110y, 110z. Uplink transmissions from UE 120y may interfere with femto eNBs 110y, 110z; uplink transmissions from UE 120y may jam femto eNBs 110y, 110z and degrade the quality of reception of other uplink signals to femto eNBs 110y, 110z. Femto eNB 110y may be an open-access femto eNB with no restricted associations to UEs. In one example femto eNB 110z may be a higher transmission power eNB initially deployed to provide coverage to an area. Femto eNB 110z may be deployed to cover a large service area. Femto eNB 110y may be a lower transmission power eNB deployed later than Femto eNB 110z to provide coverage for a hotspot area for loading traffic from either or both eNB 110c, eNB 110z. The uplink transmissions from UE 120y may interfere with transmissions from UE 120f and reduce the quality of service QoS experienced by UE 120f. Femto eNB 110y may seek to adapt its transmission power to mitigate interference in accordance with the methodology below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
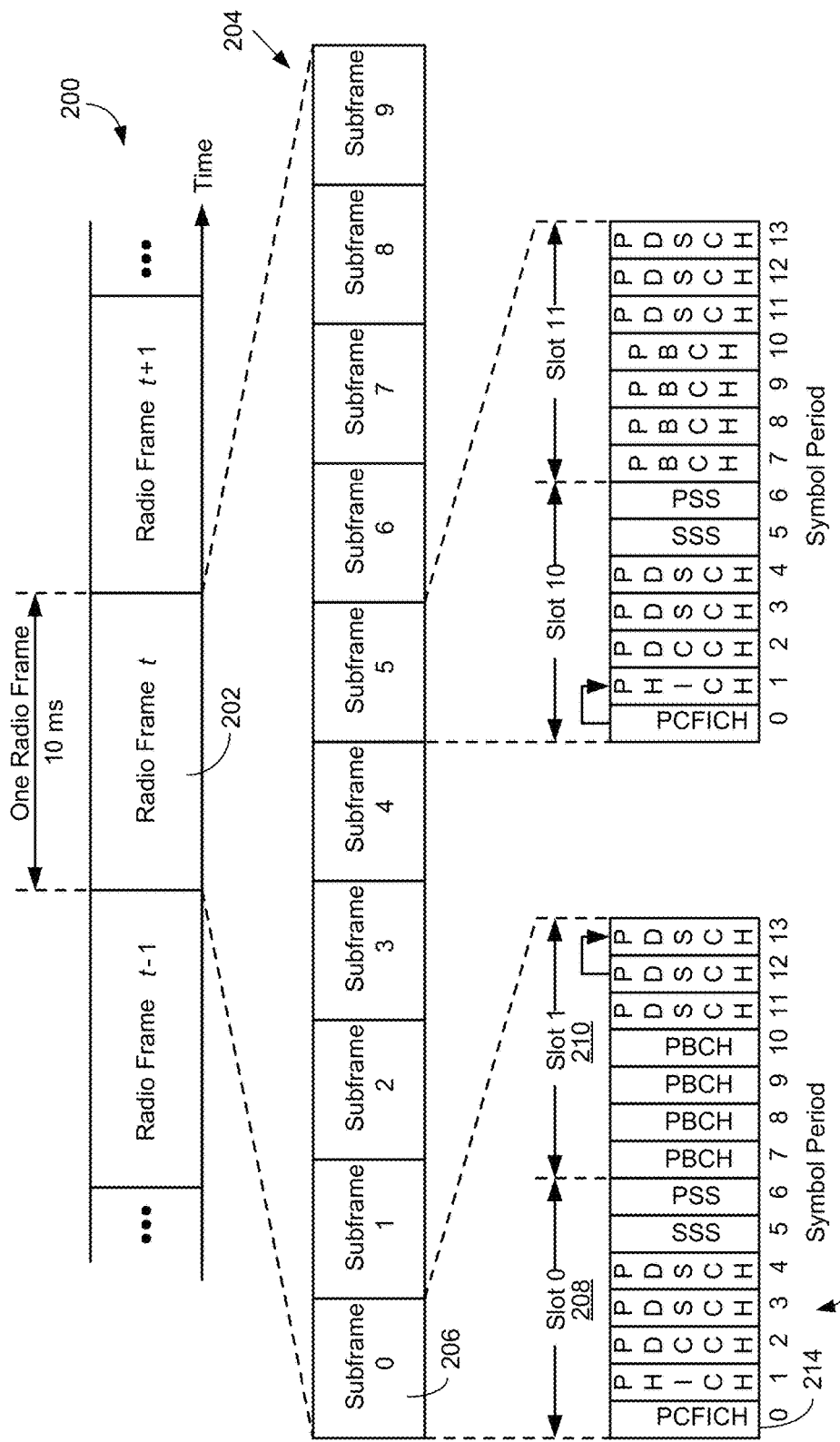
FIG. 2 is a block diagram conceptually illustrating an example of a down link frame structure in a telecommunications system.
Figure 6:
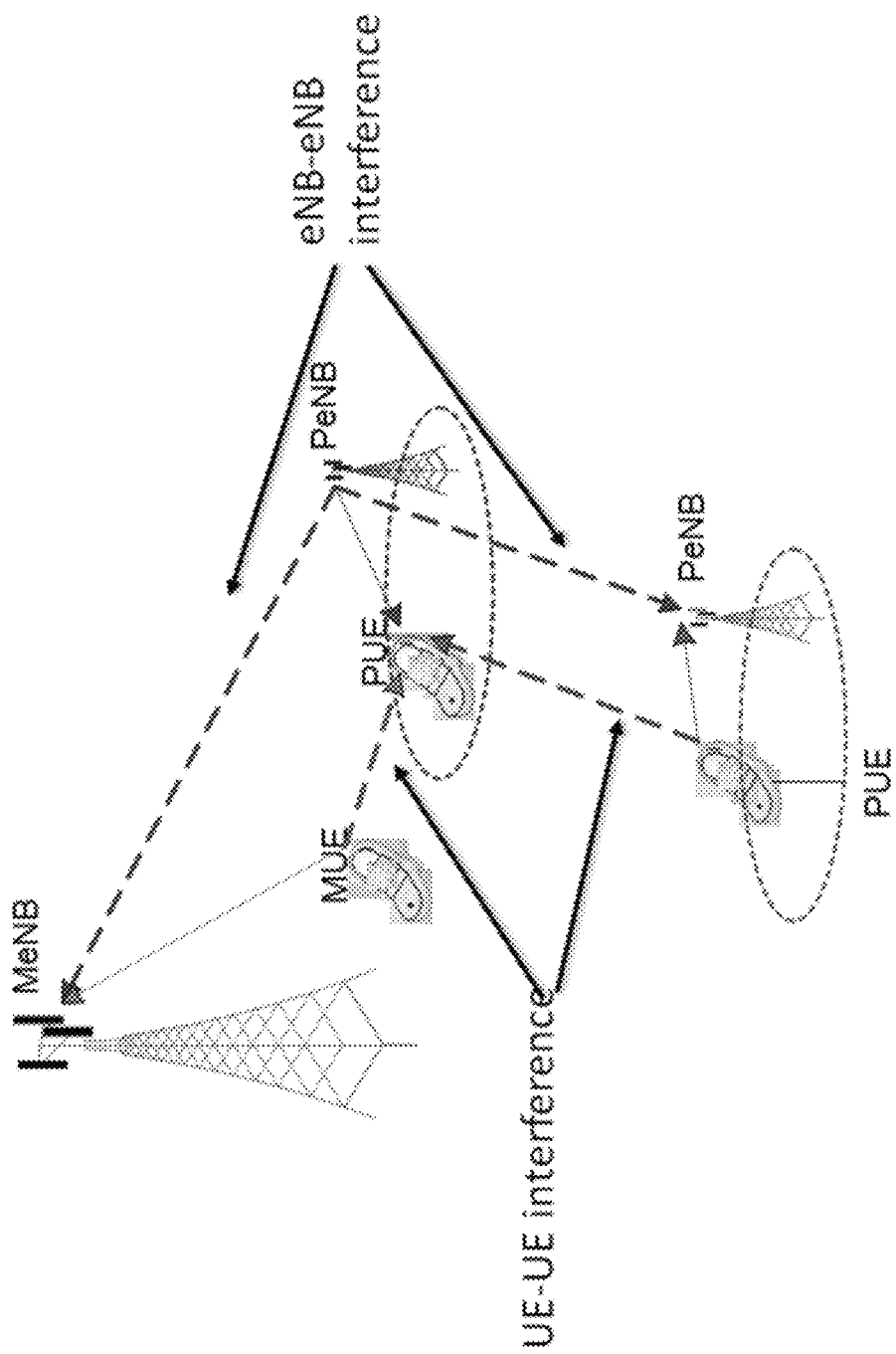
FIG. 6 illustrates downlink-uplink interference with adjacent cells having different transmission directions.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH may also be included in the first symbol period. Similarly, the PHICH and PDCCH may also both be in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
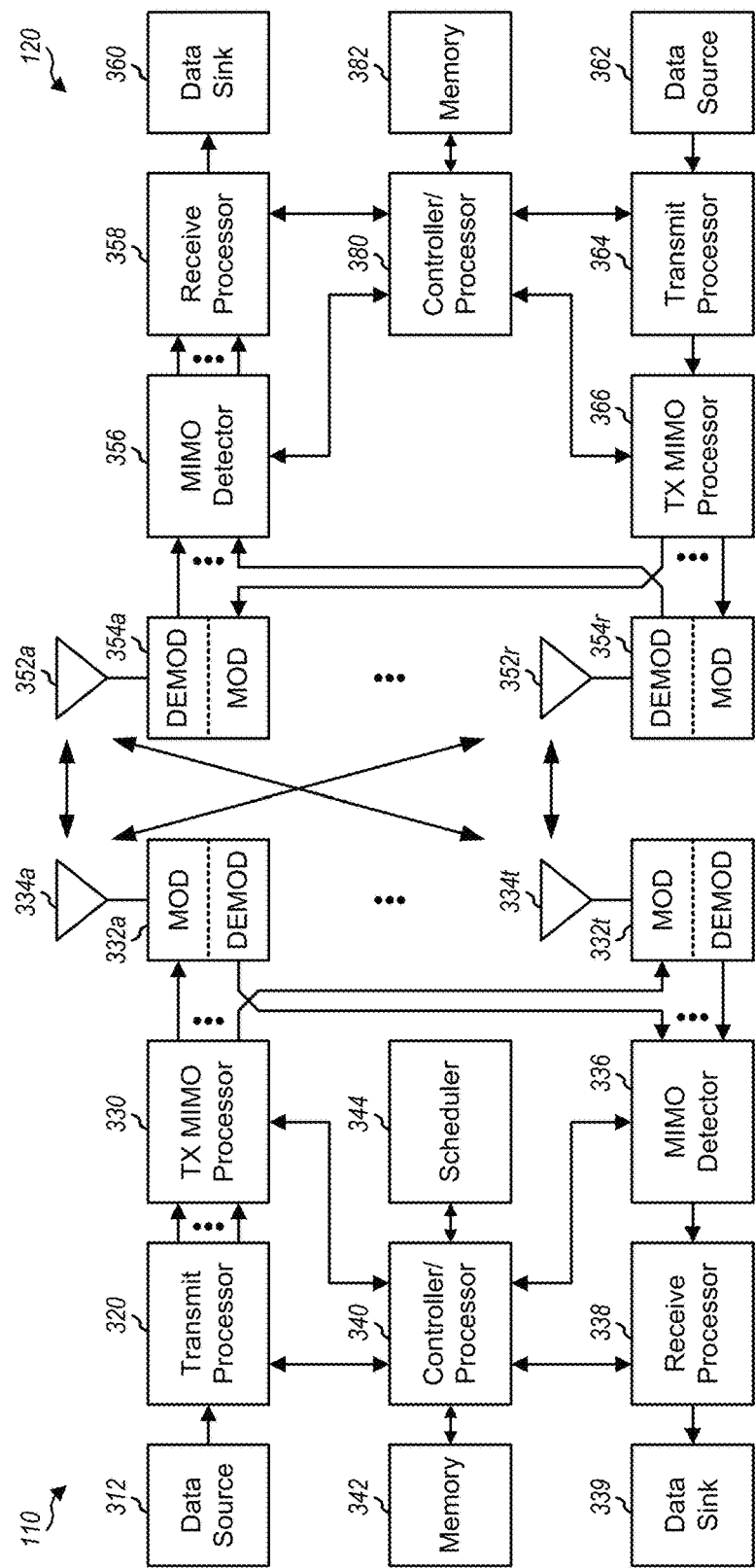
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354*a*, and the antennas 352*a* configured to perform the functions recited by the aforementioned means. In another aspect, the aforementioned means may be a module or any apparatus configured to perform the functions recited by the aforementioned means.

Figure 4:
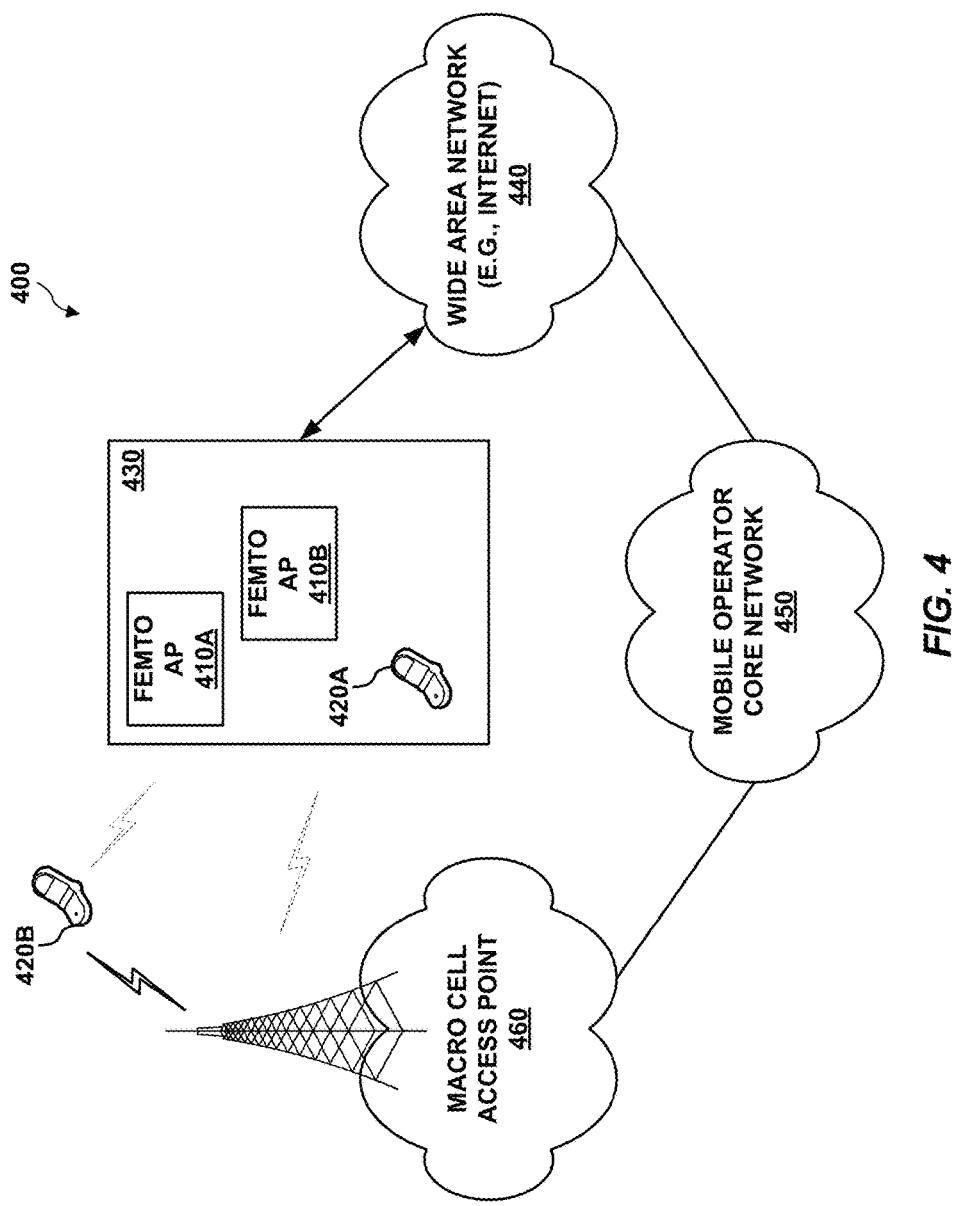
FIG. 4 is a block diagram illustrating another example communication system.

FIG. 4 illustrates an exemplary communication system 400 where one or more FAPs are deployed within a network environment. Specifically, the system 400 includes multiple FAPs 410A and 410B (e.g., FAPs or H(e)NB) installed in a relatively small scale network environment (e.g., in one or more user residences 430). Each FAP 410 may be coupled to a wide area network 440 (e.g., the Internet) and a mobile operator core network 450 via a digital subscriber line (DSL) router, a cable modem, a wireless link, or other connectivity means (not shown). As will be discussed below, each FAP 410 may be configured to serve associated access terminals 420 (e.g., access terminal 420A) and, optionally, alien access terminals 420 (e.g., access terminal 420B). In other words, access to FAPs 410 may be restricted such that a given access terminal 420 may be served by a set of designated (e.g., home) FAP(s) 410 but may not be served by any non-designated FAPs 410 (e.g., a neighbor's FAP).

Referring again to FIG. 4, the owner of a FAP 410 may subscribe to mobile service, such as, for example, 3G mobile service, offered through the mobile operator core network 450. In another example, the FAP 410 may be operated by the mobile operator core network 450 to expand coverage of the wireless network. In addition, an access terminal 420 may be capable of operating both in macro environments and in smaller scale (e.g., residential) network environments. Thus, for example, depending on the current location of the access terminal 420, the access terminal 420 may be served by a macro access point 460 or by any one of a set of FAPs 410 (e.g., the FAPs 410A and 410B that reside within a corresponding user residence 430). For example, when a subscriber is outside his home, he is served by a standard macro access point (e.g., node 460) and when the subscriber is at home, he is served by a FAP (e.g., node 410A). Here, it should be appreciated that a FAP 410 may be backward compatible with existing access terminals 420.

A FAP 410 may be deployed on a single frequency or, in the alternative, on multiple frequencies. Depending on the particular configuration, the single frequency or one or more of the multiple frequencies may overlap with one or more frequencies used by a macro access point (e.g., node 460). In some aspects, an access terminal 420 may be configured to connect to a preferred FAP (e.g., the home FAP of the access terminal 420) whenever such connectivity is possible. For example, whenever the access terminal 420 is within the user's residence 430, it may communicate with the home FAP 410.

In some aspects, if the access terminal 420 operates within the mobile operator core network 450 but is not residing on its most preferred network (e.g., as defined in a preferred roaming list), the access terminal 420 may continue to search for the most preferred network (e.g., FAP 410) using a Better System Reselection (BSR), which may involve a periodic scanning of available systems to determine whether better systems are currently available, and subsequent efforts to associate with such preferred systems. Using an acquisition table entry (e.g., in a preferred roaming list), in one example, the access terminal 420 may limit the search for specific band and channel. For example, the search for the most preferred system may be repeated periodically. Upon discovery of a preferred FAP, such as FAP 410, the access terminal 420 selects the FAP 410 for camping within its coverage area.

A FAP may be restricted in some aspects. For example, a given FAP may only provide certain services to certain access terminals. In deployments with so-called restricted (or closed) association, a given access terminal may only be served by the macro cell mobile network and a defined set of FAPs (e.g., the FAPs 410 that reside within the corresponding user residence 430). In some implementations, a FAP may be restricted to not provide, for at least one access terminal, at least one of: signaling, data access, registration, paging, or service.

In some aspects, a restricted FAP (which may also be referred to as a Closed Subscriber Group H(e)NB) is one that provides service to a restricted provisioned set of access terminals. This set may be temporarily or permanently extended as necessary. In some aspects, a Closed Subscriber Group (CSG) may be defined as the set of access nodes (e.g., FAPs) that share a common access control list of access terminals. A channel on which all FAPs (or all restricted FAPs) in a region operate may be referred to as a femto channel.

Various relationships may thus exist between a given FAP and a given access terminal. For example, from the perspective of an access terminal, an open FAP may refer to a FAP with no restricted association. A restricted FAP may refer to a FAP that is restricted in some manner (e.g., restricted for association and/or registration). A home FAP may refer to a FAP on which the access terminal is authorized to access and operate on. A guest FAP may refer to a FAP on which an access terminal is temporarily authorized to access or operate on. An alien FAP may refer to a FAP on which the access terminal is not authorized to access or operate on, except for perhaps emergency situations (e.g., 911 calls).

From a restricted FAP perspective, a home access terminal may refer to an access terminal that authorized to access the restricted FAP. A guest access terminal may refer to an access terminal with temporary access to the restricted FAP. An alien access terminal may refer to an access terminal that does not have permission to access the restricted FAP, except for perhaps emergency situations, for example, 911 calls (e.g., an access terminal that does not have the credentials or permission to register with the restricted FAP).

For convenience, the disclosure herein describes various functionality in the context of a FAP. It should be appreciated, however, that a pico node may provide the same or similar functionality as a FAP, but for a larger coverage area. For example, a pico node may be restricted; a home pico node may be defined for a given access terminal, and so on.

Figure 5:
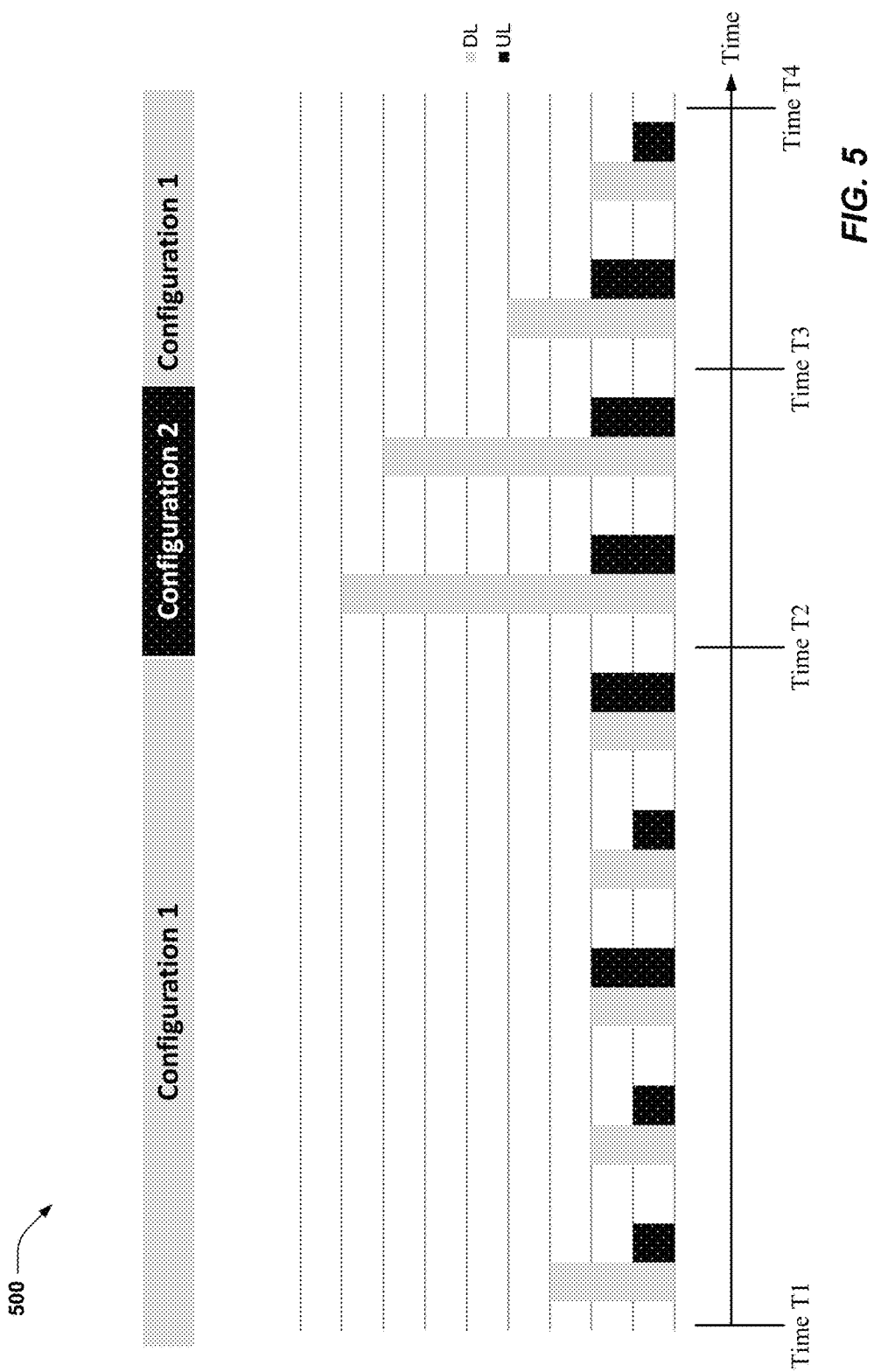
FIG. 5 illustrates exemplary adaptable downlink/uplink traffic loading configurations.

FIG. 5 illustrates exemplary adaptable downlink/uplink traffic loading configurations. Flexible DL/UL configurations may be one efficient way to utilize TDD spectrum. In the example, of FIG. 5, multiple configurations may be used for the traffic loading illustrated by the bar graph. From time T1 to T2, Configuration 1 may be used. From time T2 to T3, Configuration 2 may be used. From time T3 to T4, Configuration 1 may be used. In this manner the TDD spectrum may be more efficiently used. For example, during the high traffic loading period between time T2 and time T3, a suitable DL/UL configuration (e.g., Configuration 2) is used. During lower traffic loading periods from time T1 to T2 and from time T3 to T4, a suitable DL/UL configuration (e.g., Configuration 1) or configurations are used.

FIG. 6 illustrates downlink-uplink interference with adjacent cells having different transmission directions. In FIG. 6, a macro eNB (MeNB) and pico eNBs (PeNBs) may experience interference. Macro UEs (MUEs) and pico UEs (PUEs) may experience interference. For example, there may be eNB to eNB interference, UE to UE interference and eNB to UE interference. FIG. 6 shows possible interference between the MeNB and PeNB, and interference between the PeNB and PeNB. FIG. 6 shows possible interference between the MUE and PUE, and between the PUE and PUE.

Figure 7:
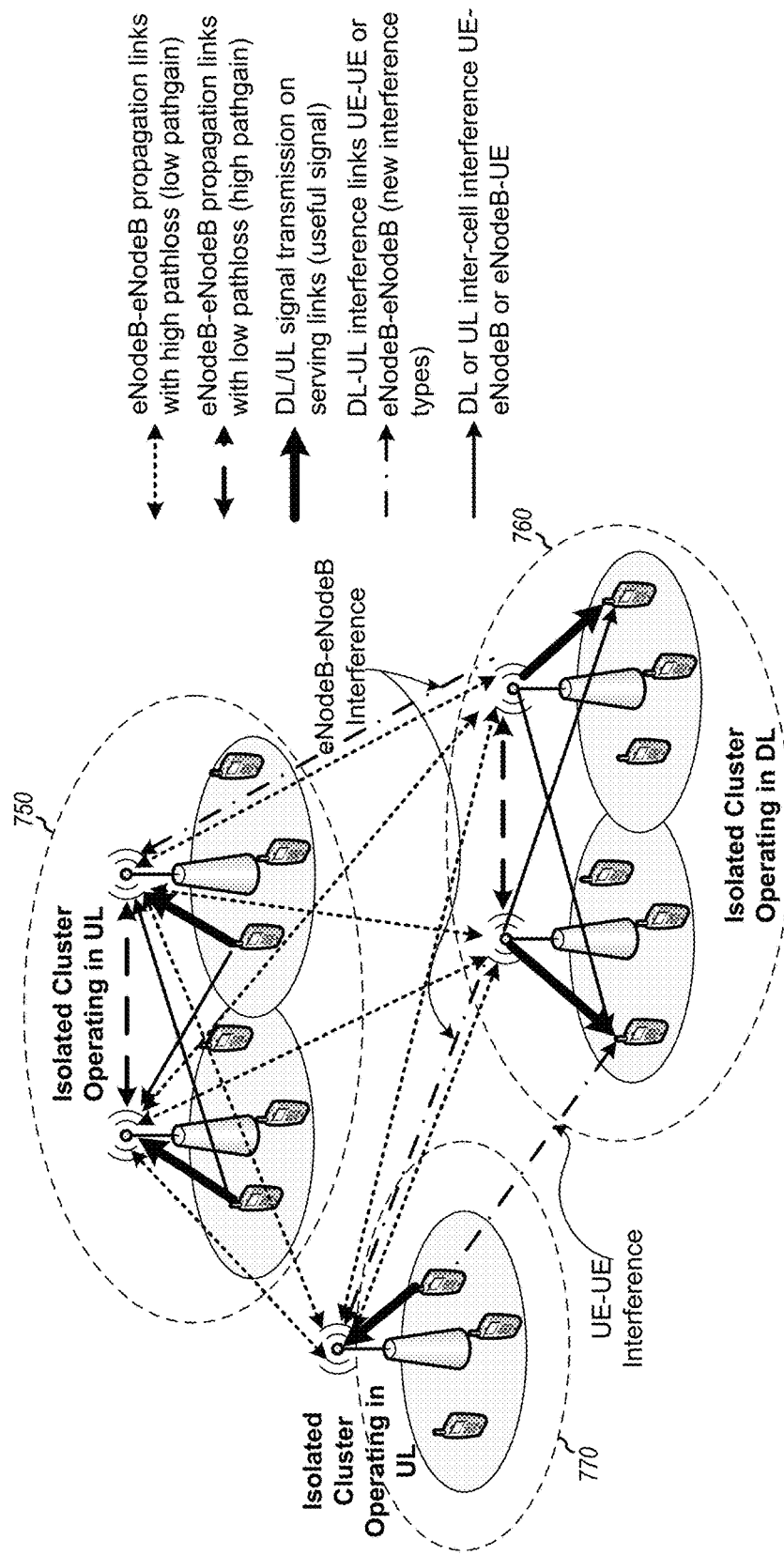
FIG. 7 illustrates cell cluster interference management.

FIG. 7 illustrates cell cluster interference management. To avoid negative impact of the DL to UL interference on the UL signal to interference plus noise ratio (SINR), a cell clustering approach may be used. For example, the cell clustering approach as described in 3GPP RAN1/4 may be used. The eNBS that have coupling loss less than a threshold may transmit in the same direction. For example, for an outdoor picocell only scenario, the pico cells may be grouped as a cluster if the coupling loss between two picocells is less than a predefined threshold value. The transmission direction of the picocells within a cluster may be the same. Three clusters are illustrated in FIG. 7. One cluster 750 including two cells may be operating in the UL. Another cluster 770 including one cell may be operating in the UL. Yet another cluster 760 including two cells may be operating in the DL. The transmission link or propagation link between some eNBs may experience high path loss (or low path gain). For example, the propagation link between eNBs in different clusters may have high path loss. The transmission link or propagation link between some eNBs may experience low path loss (or high path gain). For example, the propagation link between eNBs in the same cluster may have low path loss. A cell may serve a UE. The DL/UL signal transmission may be a useful signal on the service link(s). UEs or eNBs may experience interference on the DL or UL. For example, there may be UE to UE interference and eNB to eNB interference. For example, there may be UE to eNB interference.

Figure 8:
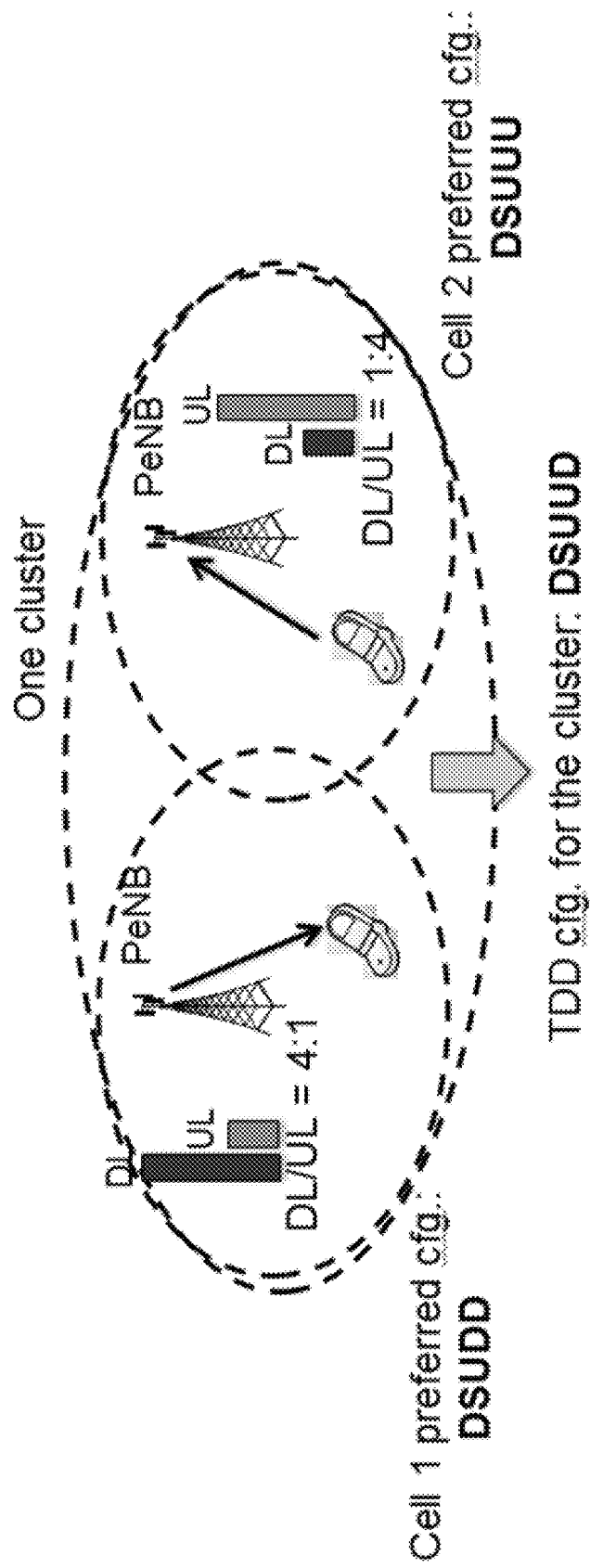
FIG. 8 illustrates a combined TDD configuration for two cells with different TDD configurations.

FIG. 8 illustrates a combined TDD configuration for two cells with different TDD configurations. In CCIM, cells within one cluster may have the same transmission direction to avoid high eNB to eNB interference so an identical TDD configuration may be selected for all cells in the cluster. Adaptation flexibility may be reduced due to CCIM. Adaptation flexibility may be reduced when cells in one cluster have different DL/UL traffic loading ratio and expect to use different TDD configuration. In the example of FIG. 8, a cell 1 may have a DL/UL ratio of 4 to 1. In an example, the preferred configuration for cell 1 may be "DSUDD" where D indicates a downlink frame/subframe, S indicates a special frame/subframe, and U indicates an uplink frame/subframe. In an example, the preferred configuration for cell 2 may be "DSUUU". One example TDD configuration for the cell cluster including cell 1 and cell 2 may be "DSUUD".

FIGS. 9A-C illustrate de-clustering methods and related issues. De-clustering methods may improve adaption flexibility. De-clustering methods, however, may not work for the case of clusters with cell size two. If one of the two cells I mute or working in anchor sub-frame only mode, then the adaptation flexibility of this cell may be lost as well. In the cases where cluster size two is dominant, further enhancements for CCIM may be desirable to improve the flexibility for adaptation. For example, cluster size result may be described in 3GPP R1-122879. FIG. 9C illustrates example common numbers of picocells within a cluster in some deployment scenarios. In some scenarios, sixty six percent of clusters may include a single picocell. Twenty one percent of clusters may include two picocells. Seven percent of picocells may include three picocells. Six percent of clusters may include more than three picocells. The example of FIG. 9C illustrates that clusters with two picocells may be the second most common form after single picocell clusters.

In accordance with one or more embodiments of the present disclosure, there are provided techniques for interference management using dynamic point selection (DPS) or semi-static point selection (SPSS). For example, a cell cluster interference management (CCIM) scheme may use DPS or SPSS for enhanced interference management and traffic adaptation (eIMTA). An enhanced CCIM scheme may use two categories of CoMP schemes, e.g., DPS or SSPS, for cell clustering. DPS may include data transmission from one point (e.g., within a CoMP cooperating set) in a time-frequency resource. The transmitting point may change from one sub-frame to another. For example, the configuration may be based on a short term period such as a 1 ms transmission period. Data may be available simultaneously at multiple points (or nodes).

SSPS may include transmission to a specific UE from one transmission point at a time. The transmitting point may change in a semi-static manger. In an example, the transmission point selection may be communicated via radio resource control (RRC) signaling. The semi-static configuration may be based on longer term period such as a 200 ms transmission period. The transmission point selection may or may not be transparent to the UE.

Figure 10:
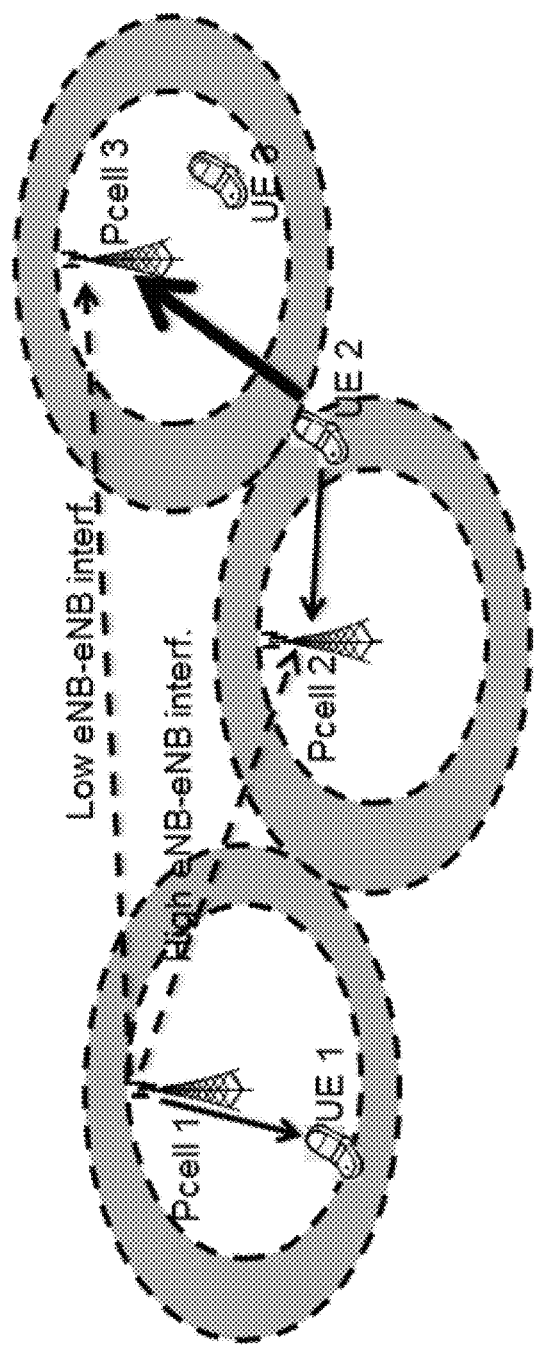
FIG. 10 illustrates an exemplary transmission point selection for a UE.

FIG. 10 illustrates one exemplary transmission point selection for a UE. When forming a cell cluster, selecting the transmitting point for the UE beforehand in order to minimize the cluster size. In one aspect, if one UE has high UL traffic, it may be desirable to select a transmission point that does not cause high eNB to eNB interference for the UE. For example, a cell/point status bit, e.g., status bit 'a', may be defined. If the cell/point has high coupling loss to its neighbor cells or there is no high DL traffic in its neighbor cells, then the status bit 'a' may be set to a first value (e.g., '1'); otherwise, the status bit may be set to a second value (e.g., '0'). It may be desirable to select a transmitting cell/point with cell status bit set to the first value for a UE with high UL traffic. Selection of the transmission point may be at an eNB or at another network entity, such as a core network entity. In the example of FIG. 10, UE 1 may have high DL traffic and UE 2 may have high UL traffic. In this case, cell 3 may be selected for the UE to mitigate eNB to eNB interference from cell 1. For example, any or all of Pcell 1, Pcell 2, and Pcell 3 may communicate interference traffic loading information (e.g., including the status bits) to each other or to another network entity. Any or all of Pcell 1, Pcell 2, and Pcell 3 or another network entity may receive reports (e.g., measurement reports) from any or all of UE 1, UE 2, and UE 3, directly or indirectly. Pcell 3 may determine from the received information that UE 1 has high DL traffic and UE 2 has high UL traffic. Based on the information, Pcell 3 may be selected (e.g., by any of the Pcells or another network entity) to be a transmission point for UE 2.

Figure 11:
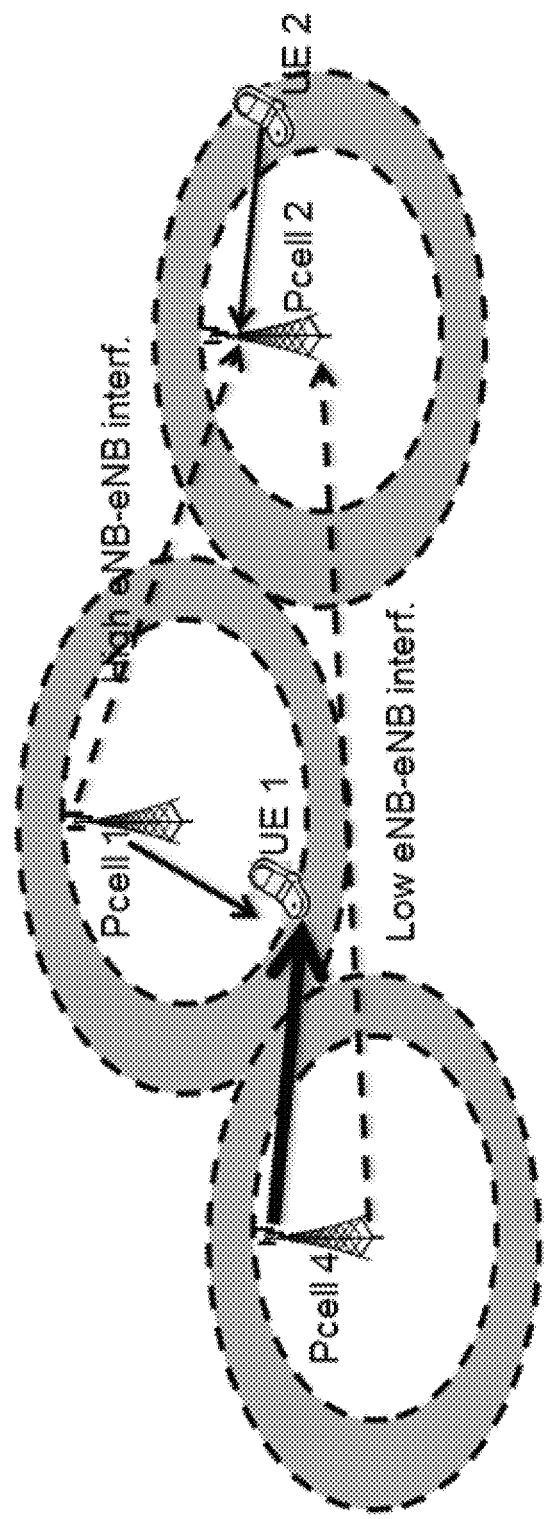
FIG. 11 illustrates another exemplary transmission point selection for a UE.

When forming a cell cluster, selecting the transmitting point for the UE beforehand in order to minimize the cluster size. In one aspect, if one UE has high DL traffic, it may be desirable to select a transmission point that does not cause high eNB to eNB interference for the UE. For example, a cell/point status bit, e.g., status bit 'b', may be defined. If the cell/point has high coupling loss to its neighbor cells or there is no high UL traffic in its neighbor cells, then the status bit 'b' may be set to a first value (e.g., '1'); otherwise, the status bit may be set to a second value (e.g., '0'). It may be desirable to select a transmitting cell/point with cell status bit set to the first value for a UE with high DL traffic. Selection of the transmission point may be at an eNB or at another network entity, such as a core network entity. In the example of FIG. 11, UE 1 may have high DL traffic and UE 2 may have high UL traffic. In this case, cell 4 may be selected for the UE to mitigate eNB to eNB interference from cell 1. For example, any or all of Pcell 1, Pcell 2, and Pcell 4 may communicate interference and traffic loading information (e.g., including the status bits) to each other or to another network entity. Any or all of Pcell 1, Pcell 2, and Pcell 4 or another network entity may receive reports (e.g., measurement reports) from any or all of UE 1 and UE 2, directly or indirectly. Pcell 4 may determine from the received information that UE 1 has high DL traffic and UE 2 has high UL traffic. Based on the information, Pcell 4 may be selected (e.g., by any of the Pcells or another network entity) to be a transmission point for UE 1.

Figure 12:
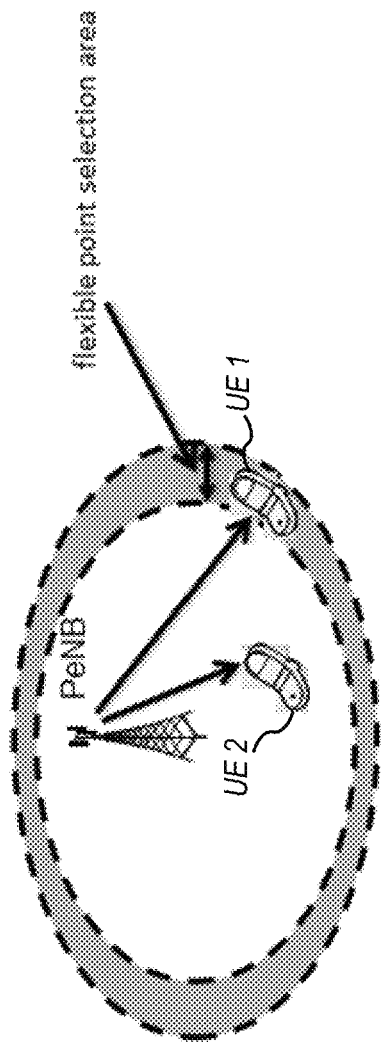
FIG. 12 illustrates defining a flexible point selection area.

FIG. 12 illustrates defining a flexible point selection area. Because DPS and SSPS may benefit cell edge UEs, sometimes more than UEs with stronger signal strengths, a flexible point selection area may be defined for each cell. A flexible point selection area may be an area where DPS or SSPS may be performed for a UE. When a UE has a strong signal strength with a serving cell, it may not be necessary to perform DPS or SSPS. In one aspect, a flexible point selection area may be defined by a path-loss threshold. UEs with path-loss larger than the threshold may belong to the flexible point selection area. For example, UE 1 in FIG. 12 may have a path loss greater than the threshold. The PeNB may determine that UE 1 resides within the flexible point selection area. UE 2 may have a path loss less than then threshold. The PeNB may determine that UE 2 does not reside within the flexible point selection area.

In another aspect, the flexible point selection area may be defined by a path-loss or geometry difference between a serving cell and neighboring cell(s). For example, if the difference of a UE is within a threshold, the UE may belong to the flexible point selection area. UEs located in this flexible point selection area may be assigned a dynamic transmitting point as described with respect to FIGS. 10 and 11.

Figure 13:
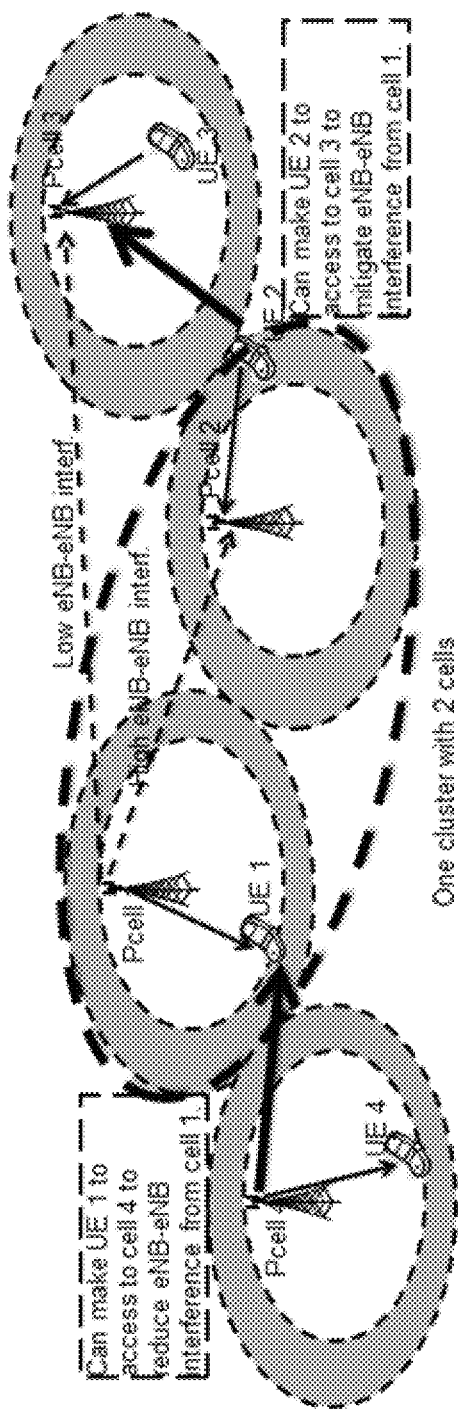
FIG. 13 illustrates switching of UEs at flexible cell selection area.

FIG. 13 illustrates switching of UEs at flexible cell selection area. If two adjacent are within one cluster, it may be desirable to switch the UEs at the flexible cell selection area of the two cells to access another neighbor cell that is not within the cluster of these two cells by fast cell selection. In one aspect, the UE may be switched from a 'victim' cell (or source cell) to its neighbor cell if there is not heavy DL/UL traffic and UL IoT is low. An UL status bit may be defined. For example, the UL status bit may be set to a first value (e.g., '1') if there is not heavy DL/UL traffic and UL IoT is low, otherwise the status bit may be set to a second value (e.g., '0'). This status bit may be broadcast or otherwise communicated to neighbor cells.

In another aspect, UEs may be switched in the 'aggressor' cell to its neighbor cell if there is no heavy UL/DL traffic. A UL status bit may be defined. The UL status bit may be set to a first value (e.g., '1') if there is not heavy DL/UL traffic and UL IoT is low, otherwise the status but may be set to a second value (e.g., '0'). This status bit may be broadcast or otherwise communicated to neighbor cells.

Figure 14:
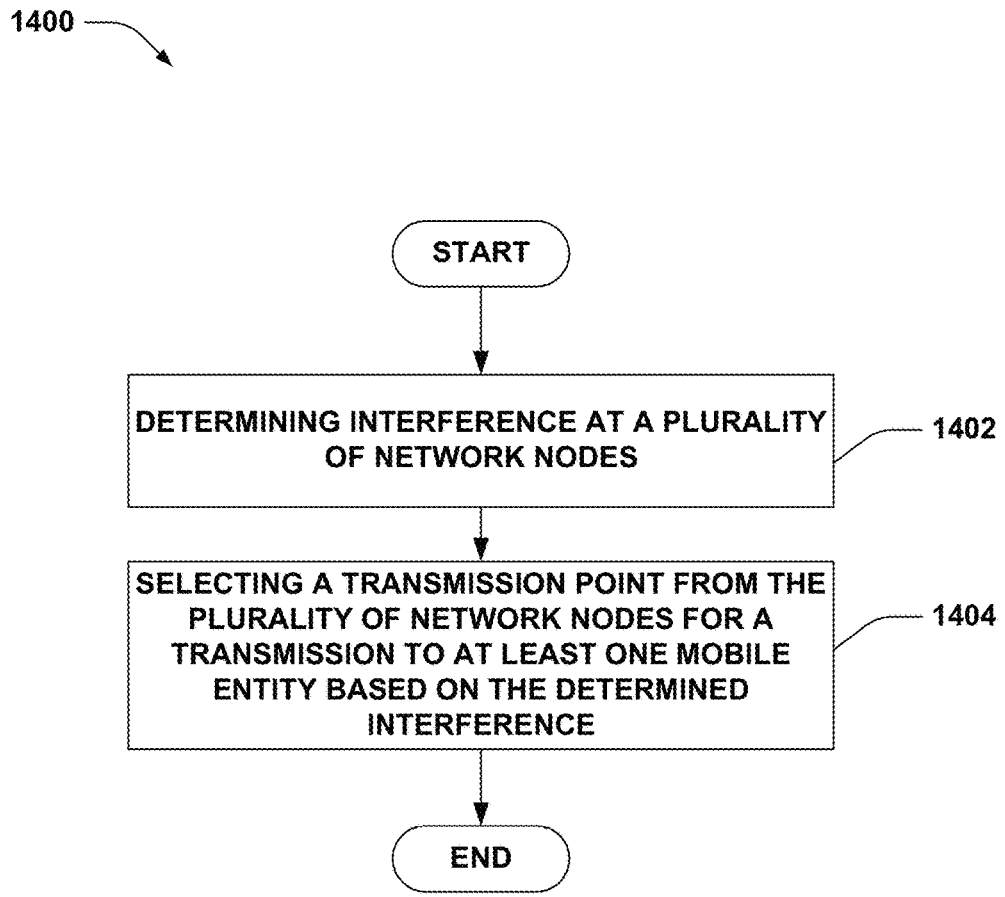
FIG. 14 illustrates a methodology for interference management.

In accordance with one or more aspects of the embodiments described herein, with reference to FIG. 14, there is shown a methodology 1400, operable by an access node or other network entity, such as, for example, an eNB, picocell, core network entity, or the like. Specifically, method 1400 describes a way to mitigate interference using DPS or SSPS. The method 1400 may involve, at 1402, determining interference at a plurality of network nodes. The method 1400 may involve, at 1704, selecting a transmission point from the plurality of network nodes for a transmission to at least one mobile entity based on the determined interference.

Figure 15:
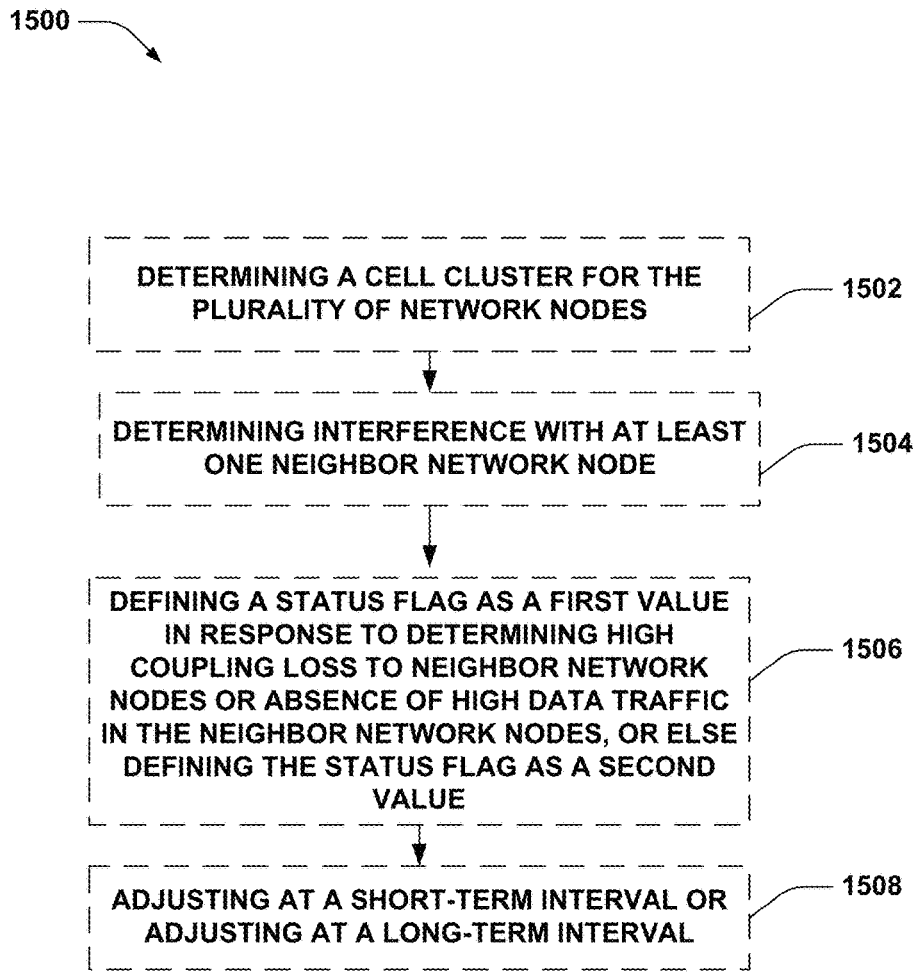
FIG. 15 illustrates other operations or aspects of the methodology of FIG. 14.
Figure 16:
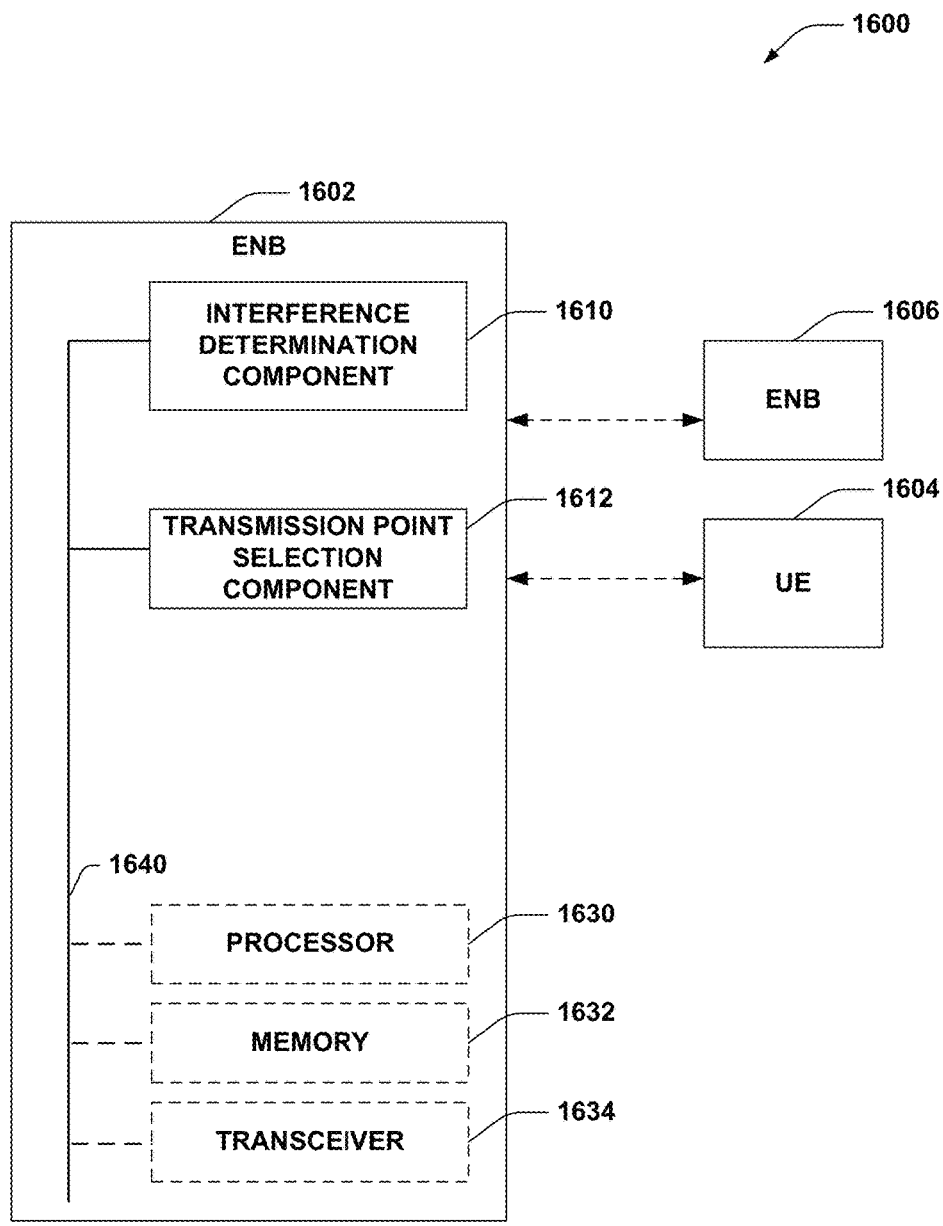
FIG. 16 illustrates an embodiment of an apparatus for interference management, in accordance with the methodology of FIG. 14.

With reference to FIG. 15, there is shown further operations 1500 or aspects of the method 1400 that are optional and may be performed by a access node, network entity, or the like. If the method 1500 includes at least one block of FIG. 15, then the method 1500 may terminate after the at least one block, without necessarily having to include any subsequent downstream block(s) that may be illustrated. It is further noted that numbers of the blocks do not imply a particular order in which the blocks may be performed according to the method 1500. For example, the method 1500 may further involve, at 1502, determining a cell cluster for the plurality of network nodes. For example, the method 1500 may further involve, at step 1504, determining interference with at least one neighbor network node. The method 1500 may further involve, at 1506, defining a status flag as a first value in response to determining high coupling loss to neighbor network nodes or absence of high data traffic in the neighbor network nodes, or else defining the status flag as a second value. The method 1500 may further involve, at 1508, transmitting the status flag from one network node in the plurality of network nodes to another network node in the plurality of network nodes. With reference to FIG. 16, there is provided an exemplary apparatus 1602 that may be configured as an eNB (e.g., a picocell) in a wireless system 900, or as a processor or similar device/component for use within the apparatus. In another embodiment, the exemplary apparatus 1602 that may be configured as another network entity such as a core network entity. The apparatus 1602 may include functional blocks that may represent functions implemented by a processor, software, or combination thereof (e.g., firmware). For example, apparatus 1602 may include an interference determination component 1610 for determining interference at a plurality of network nodes. The interference determination component 1610 may be configured for determining interference with at least one neighbor network node. The interference determination component 1610 may be, or may include, a means for determining interference at a plurality of network nodes. Said means may include an algorithm executed by one or more processors, or one or more processors coupled to a transceiver. The algorithm may include, for example, one or more of algorithms 1402 and 1504 described above in connection with FIGS. 14-15.

For example, apparatus 1602 may include a transmission point selection component 1612 for selecting a transmission point from the plurality of network nodes for a transmission to at least one mobile entity based on the determined interference. The transmission point selection component 1612 may be, or may include, means for selecting a transmission point from the plurality of network nodes for a transmission to at least one mobile entity based on the determined interference. Said means may include an algorithm executed by one or more processors. The algorithm may include, for example, one or more of algorithms 1404 described above in connection with FIG. 14.

Additionally, the apparatus 1602 may include a memory 1632 that retains instructions for executing functions associated with the components 1610-1612. While shown as being external to memory 1632, it is to be understood that one or more of the components 1610-1612 may exist within memory 1632. In one example, components 1610-1612 may comprise at least one processor, or each component 1610-1612 may be a corresponding module of at least one processor. Moreover, in an additional or alternative example, components 1610-1612 may be a computer program product comprising a computer readable medium, where each component 1610-1612 may be corresponding code.

In related aspects, the apparatus 1602 may optionally include a processor component 1630 having at least one processor. The processor 1630, in such case, may be in operative communication with the components 1610-1612 via a bus 1640 or similar communication coupling. The processor 1630 may effect initiation and scheduling of the processes or functions performed by components 1610-1612. In further related aspects, the apparatus 1602 may include a radio transceiver component 1634. A stand-alone receiver and/or stand-alone transmitter may be used in lieu of or in conjunction with the transceiver component 1634. The radio transceiver component 1634 may be configured for connecting to one or more communication devices, such as access node 1606 or UE 1604. The apparatus 1602 may also include a network interface (not shown) for connecting to one or more network entities, such as access node 1606.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for interference management in a wireless communications system (WCS), the method comprising:
   determining, by a network entity, interference between two nodes of a plurality of network nodes; and
   selecting, by the network entity, a transmission point, from the plurality of network nodes, for a transmission to at least one mobile entity based on the determined interference and based on a cell status bit associated with the transmission point.

2. The method of claim 1, wherein selecting the transmission point is based on dynamic point selection of the transmission point on a sub-frame basis.

3. The method of claim 1, wherein selecting the transmission point is based on semi-static point selection of the transmission point in a semi-static manner.

4. The method of claim 1, wherein determining the interference is based on at least one of received indications from the plurality of network nodes or reports from mobile entities.

5. The method of claim 1, wherein determining the interference comprises determining the interference with at least one neighbor network node.

6. The method of claim 5, further comprising defining a status flag as a first value, of the first value and a second value, based on determining high coupling loss to neighbor network nodes or absence of high data traffic in the neighbor network nodes, wherein selecting the transmission point is based on the status flag being the first value.

7. The method of claim 6, further comprising transmitting the status flag from one network node in the plurality of network nodes to another network node in the plurality of network nodes.

8. The method of claim 1, wherein the transmission point is selected based on the cell status bit, associated with the transmission point, being set to a value corresponding to a rate of downlink traffic.

9. A network entity for interference management in a wireless communications system (WCS), the network entity comprising:
   at least one processor configured to determine interference between two nodes of a plurality of network nodes, and select a transmission point, from the plurality of network nodes, for a transmission to at least one mobile entity based on the determined interference and based on a cell status bit associated with the transmission point; and
   a memory coupled to the at least one processor for storing data.

10. The network entity of claim 9, wherein the transmission point is selected based on dynamic point selection of the transmission point on a sub-frame basis.

11. The network entity of claim 9, wherein the transmission point is selected based on semi-static point selection of the transmission point in a semi-static manner.

12. The network entity of claim 9, wherein the interference is determined with at least one neighbor network node.

13. The network entity of claim 9, wherein the interference is determined based on at least one of received indications from the plurality of network nodes or reports from mobile entities.

14. The network entity of claim 13, wherein the at least one processor is further configured to define a status flag as a first value, of the first value and a second value, based on determining high coupling loss to neighbor network nodes or absence of high data traffic in the neighbor network nodes, wherein the transmission point is selected based on the status flag being the first value.

15. The network entity of claim 14, wherein the at least one processor is further configured to transmit the status flag from one network node in the plurality of network nodes to another network node in the plurality of network nodes.

16. The network entity of claim 9, wherein the transmission point is selected based on the cell status bit, associated with the transmission point, being set to a value corresponding to a rate of downlink traffic.

17. A network entity for interference management in a wireless communications system (WCS), the network entity comprising:

means for determining interference between two nodes of a plurality of network nodes, and
means for selecting a transmission point, from the plurality of network nodes, for a transmission to at least one mobile entity based on the determined interference and based on a cell status bit associated with the transmission point.

18. The network entity of claim 17, wherein the transmission point is selected based on dynamic point selection of the transmission point on a sub-frame basis.

19. The network entity of claim 17, wherein the transmission point is selected based on semi-static point selection of the transmission point in a semi-static manner.

20. The network entity of claim 17, wherein the interference is determined based on at least one of received indications from the plurality of network nodes or reports from mobile entities.

21. The network entity of claim 17, wherein the interference is determined with at least one neighbor network node.

22. The network entity of claim 21, further comprising means for defining a status flag as a first value, of the first value and a second value, based on determining high coupling loss to neighbor network nodes or absence of high data traffic in the neighbor network nodes, wherein the transmission point is selected based on the status flag being the first value.

23. The network entity of claim 22, further comprising means for transmitting the status flag from one network node in the plurality of network nodes to another network node in the plurality of network nodes.

24. The network entity of claim 17, wherein the transmission point is selected based on the cell status bit, associated with the transmission point, being set to a value corresponding to a rate of downlink traffic.

25. A non-transitory computer-readable medium storing instructions, the instructions comprising:
   one or more instructions that, when executed by at least one network entity, cause the at least one network entity to:
      determine interference at a plurality of network nodes, and
      select a transmission point, from the plurality of network nodes, for a transmission to at least one mobile entity based on the determined interference and based on a cell status bit associated with the transmission point.

26. The non-transitory computer-readable medium of claim 25, wherein the transmission point is selected based on dynamic point selection of the transmission point on a sub-frame basis.

27. The non-transitory computer-readable medium of claim 25, wherein the transmission point is selected based on semi-static point selection of the transmission point in a semi-static manner.

28. The non-transitory computer-readable medium of claim 25, wherein the interference is determined based on at least one of received indications from the plurality of network nodes or reports from mobile entities.

29. The non-transitory computer-readable medium of claim 25, wherein the interference is determined with at least one neighbor network node.

30. The non-transitory computer-readable medium of claim 29, wherein the instructions further comprise:
   one or more instructions that, when executed by the at least one network entity, cause the at least one network entity to:

define a status flag as a first value, of the first value and a second value, based on determining high coupling loss to neighbor network nodes or absence of high data traffic in the neighbor network nodes, wherein the transmission point is selected based on the status flag being the first value.

31. The non-transitory computer-readable medium of claim 30, wherein the instructions further comprise:
one or more instructions that, when executed by the at least one network entity, cause the at least one network entity to:
transmit the status flag from one network node in the plurality of network nodes to another network node in the plurality of network nodes.

32. The non-transitory computer-readable medium of claim 25, wherein the transmission point is selected based on the cell status bit, associated with the transmission point, being set to a value corresponding to a rate of downlink traffic.

* * * * *